United States Patent [19]

Kozawa

[11] 3,956,018

[45] May 11, 1976

[54] PRIMARY ELECTRIC CURRENT-PRODUCING DRY CELL USING A $(CF_x)_x$ CATHODE AND AN AQUEOUS ALKALINE ELECTROLYTE

[75] Inventor: Akiya Kozawa, Middleburg Heights, Ohio

[73] Assignee: Union Carbide Corporation, New York, N.Y.

[22] Filed: Dec. 30, 1974

[21] Appl. No.: 537,596

[52] U.S. Cl. .............................. 136/102; 136/107
[51] Int. Cl.² .................................. H01M 6/00
[58] Field of Search ............. 136/102, 107, 100 R, 136/30, 137

[56] References Cited
UNITED STATES PATENTS

| | | |
|---|---|---|
| 3,205,097 | 9/1965 | Clune et al. .................... 136/102 |
| 3,457,117 | 7/1969 | Angelovich .................... 136/107 X |
| 3,463,669 | 8/1969 | Jammet .......................... 136/107 X |
| 3,466,195 | 9/1969 | Spellman et al. ............... 136/107 X |
| 3,514,337 | 5/1970 | Broeuer et al. ................. 136/100 R |
| 3,536,532 | 10/1970 | Watanabe et al. ............. 136/107 X |
| 3,700,502 | 10/1972 | Watanabe et al. ............. 136/6 |
| 3,716,411 | 2/1973 | Ogawa et al. ................... 136/107 X |

*Primary Examiner*—John H. Mack
*Assistant Examiner*—C. F. LeFevour
*Attorney, Agent, or Firm*—Eugene Lieberstein

[57] ABSTRACT

Primary electric current-producing dry cell comprising a zinc anode, a cathode composed of a polycarbonfluoride compound $(CF_x)_n$ and an aqueous alkaline electrolyte.

31 Claims, 3 Drawing Figures

PRIMARY ELECTRIC CURRENT-PRODUCING DRY CELL USING A $(CF_x)_N$ CATHODE AND AN AQUEOUS ALKALINE ELECTROLYTE

The present invention relates to primary electric current-producing dry cells and more particularly to dry cells utilizing a zinc anode, a cathode composed of a polycarbonfluoride compound and an aqueous alkaline electrolyte.

Polycarbonfluoride compounds of the type to which this invention refers have the general formula $(CF_x)_n$ wherein $x$ represents the ratio of fluorine atoms to carbon atoms in the compound and $n$ refers to an indefinite number of the recurring $(CF_x)$ groups. The chemical structure of a specific polycarbonfluoride compound may be represented by the following:

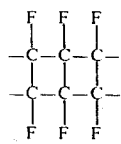

Such polycarbonfluoride compounds may be prepared in accordance with known methods by reacting various forms of carbon material, e.g., graphite, active carbon, carbon black etc., with fluorine gas at elevated temperatures (e.g. 350°–400°C).

It is already known in the prior art to employ a polycarbonfluoride compound as the active cathode material in so-called high energy density cell systems. Such cell systems employ highly active anodes which usually consist of alkali metals such as lithium and sodium. In such cell systems, it is necessary to employ non-aqueous cell electrolytes such as electrolytes based on organic solvents, since the highly active anode metals tend to react violently with water even if present in very small amounts in the cell electrolyte.

U.S. Pat. No. 3,514,337 to K. Braeuer et al. discloses such a high energy density cell system employing a lithium anode, a cathode composed of a polycarbonfluoride compound having the general formula $(C_xF)_n$ wherein $x$ is a numerical value of between 3.5 and 7.5, and a non-aqueous organic electrolyte. The highest $x$ value in these compounds corresponds to an $x$ value of about 0.28 in the $(CF_x)_n$ structure. Such compounds with a low fluorine content are characterized by low energy densities.

Subsequent experimentation in this field has led to the discovery that the more highly fluorinated, polycarbonfluoride compounds, ie $(CF_x)_n$ compounds having $x$ values of up to 1 and greater, possess excellent characteristics for use as the active cathode material. Cell systems using cathodes composed of these more highly fluorinated compounds exhibit higher energy densities and improved discharge performance.

In U.S. Pat. No. 3,536,532 to N. Watanabe et al., a high energy density cell system is disclosed in which the active cathode material is a polycarbonfluoride compound having the formula $(CF_x)_n$ wherein $x$ is not smaller than 0.5 but not larger than 1. These polycarbonfluoride compounds are prepared using a carbon material which consists mainly of crystalline carbon such as natural graphite or artificial graphite. In U.S. Pat. No. 3,700,502 also to N. Watanabe et al. a similar cell system is disclosed in which the active cathode material is a polycarbonfluoride compound having the formula $(CF_x)_n$ wherein $x$ is larger than 0 but not larger than 1 and in which the carbon material used in the preparation of the compounds consists mainly of an amorphous carbon such as coke, charcoal or active carbon. In both of the above cell systems, the active anode is an alkali metal such as lithium or sodium and the cell electrolyte is a non-aqueous solution such a 1M lithium perchlorate dissolved in an organic solvent such as propylene carbonate.

Other related highly fluorinated hydrocarbon compounds have also been tried and have proven to be dischargeable cathode materials for use in high energy density cell systems. German OLS 2,210,370, for example, discloses such a cell system in which polytetrafluoroethylene is used as the active cathode material together with a lighium anode and a non-aqueous organic electrolyte.

Polycarbonfluoride compounds and polytetrafluoroethylene are similar in their basic chemical structure and properties. They are both hydrophobic and therefore are not easily wetted by aqueous solutions. Consequently, these materials have been widely used in the battery industry as wetproofing agents for porous gas-diffusion electrodes commonly employed in aqueous electrochemical cells such as fuel cells.

Polycarbonfluoride compounds and polytetrafluoroethylene are both known to be chemically inert in aqueous environments. Moreover, it has been found that polytetrafluoroethylene is also electrochemically inactive in aqueous cell electrolytes, although the activity of this compound when used as an active cathode material in non-aqueous cells has recently been discovered, German OLS 2,210,370, supra.

Prior to the present invention, the electrochemical activity of polycarbonfluoride compounds $(CF_x)_n$ in aqueous cell electrolytes was not known. Generally, it has been presumed that the polycarbonfluoride compounds would be electrochemically inert like their related more highly fluorinated hydrocarbon relative, polytetrafluoroethylene.

It has been surprisingly found in accordance with the present invention that the polycarbonfluoride compounds $(CF_x)_n$ do exhibit substantial electrochemical activity when used as the active cathode material in aqueous zinc-alkaline cell systems.

During the course of experimentation leading to the present invention, an experimental open test cell was constructed using a platinum anode, a cathode composed of a mixture of 100 milligrams of polycarbonfluoride $(CF_{1.0})_n$, 2.0 grams coke and 1.0 gram graphite, and a 9M KOH electrolyte. The cathode mixture was thoroughly soaked with electrolyte and packed in the bottom of the experimental cell. The cathode was successfully discharged at a 1.0 milliampere current drain.

The foregoing experiment was repeated in a sealed, air-free cell of basically the same construction since it was suspected that the cathode discharge results were possibly attributable to electrochemical reduction of $O_2$ from the air rather than to reduction of the $(CF_x)_n$. In the repeated experiment, the cathode was again successfully discharged at the 1.0 milliampere drain, confirming the electrochemical activity of the polycarbonfluoride in aqueous alkaline electrolyte. The cathode was continuously discharged for six hours a day over a 12-day period. The closed circuit voltage (CCV) was periodically measured throughout the discharge period and calculated against a zinc electrode. The open circuit voltage (OCV) was also measured and calculated against a zinc electrode at the end of each open circuit period (18 hours). The following points were observed from this experiment:

1. The postulated, one electron discharge process may be represented as follows:

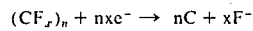

2. The discharge voltage level of the cathode at this drain is about 1.0 volt (calculated against a zinc electrode) and the discharge curve is substantially flat.

3. The open circuit voltage of the cathode is about 1.2 volts against a zinc electrode.

4. The discharge capacity of the cathode is approximately 70 milliampere-hours (mAh) per 100 milligrams of $(CF_{1.0})_n$. This capacity is approximately three times that obtained to a cut-off voltage of 0.6 volt in the discharge of conventional $MnO_2$ cathodes verses a zinc electrode in 9 molar KOH.

5. From the formula weight of $(CF_{1.0})$ equals 31, the one electron discharge process should theoretically produce 86.3 mAh/100 mg. Therefore, the utilization of the polycarbonfluoride $(CF_{1.0})_n$ cathode is 81.5 percent in this experiment.

Basically the same experiment as outlined above was carried out with a sealed cell using a cathode composed of polytetrafluoroethylene instead of $(CF_{1.0})_n$, and a 9M KOH electrolyte. The cathode was formulated in the same manner using coke and graphite as conductive materials. When discharge of the cathode on a 1 milliampere current drain was attempted, the cell voltage was approximately 0.0 volt and the cathode could not be discharged.

Broadly then, the present invention resides in a primary electric current-producing dry cell comprising a zinc anode, a cathode and an aqueous alkaline electrolyte wherein the cathode is composed predominantly of a polycarbonfluoride compound $(CF_x)_n$.

Figure 1:
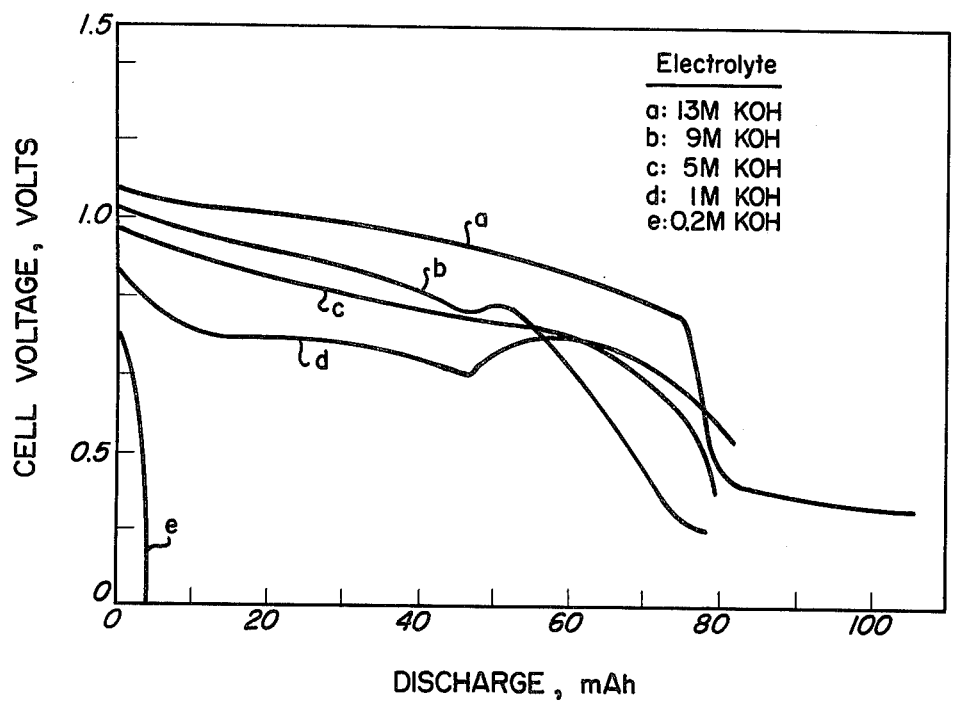
FIG. 1 is a group of curves showing the discharge characteristics of small alkaline zinc-$(CF_x)_n$ cells using various concentrations of aqueous KOH electrolyte and zinc screen anodes.

Polycarbonfluoride $(CF_x)_n$ is a black, gray or white powder depending upon the $x$ value or the ratio of fluorine atoms to carbon atoms in the compound. When the $x$ value is small or on the order of about 0.2 to 0.7, the color of the material is black. Polycarbonfluorides having an $x$ value of about 0.7 to 0.9 are gray while those materials having an $x$ value of about 1.0 or higher are white. Broadly, polycarbonfluoride materials having an $x$ value of about 0.3 to about 1.1 are useful in the present invention. Since the more highly fluorinated compounds exhibit higher energy densities, the gray or white polycarbonfluorides having an $x$ value of between about 0.8 and 1.1 are preferred for use in the present invention. The most preferred polycarbonfluoride is one having an $x$ value of about 1.0.

Cathodes made in accordance with the present invention comprises a mixture of $(CF_x)_n$ and conductive material containing from about 60 to 95 weight percent $(CF_x)_n$ powders, from about 5 to 40 weight percent of an electrically conductive material based on the weight of the active and conductive material and from about 1 to 10 weight percent of a binder and/or electrolyte-absorbing material, the latter percentages being based on the weight of the dry cathode mixture. Typically, the cathodes are made by molding this mixture under high mechanical pressure to form a cohesively bonded electrode body.

The electrically conductive material is used in the cathodes of the present invention in order to assure that good physical and electrical contact is achieved between the $(CF_x)_n$ powders and the aqueous alkaline electrolyte. A small amount of a binder material may also be employed to maintain the structural integrity of the cathodes. As hereinabove mentioned, the polycarbonfluoride compounds are basically hydrophobic in nature, i.e., they have been employed as wet-proofing agents in gas diffusion electrodes, and therefore they are not readily wet by aqueous solutions. Thus the use of an electrolyte-absorbing material in the cathodes of the present invention is highly desirable. The electrolyte-absorbing material may also serve as a binder for cohesively bonding together the $(CF_x)_n$ powders and the finely-divided electrically conductive material. Generally, most any cellulosic material can be used as the electrolyte-absorbing material. Suitable electrolyte-absorbing materials and binders are carboxymethylcellulose and carboxymethylhydroxyethylcellulose, for example. Electrolyte wettable polymeric materials as taught in U.S. application Ser. No. 437,695 may also be employed as binders.

A surfactant may also be used in the cathodes of the present invention in order to insure the wetting of the $(CF_x)_n$ powders by the aqueous alkaline electrolyte. The surfactant may be incorporated in the cathode mixture in amounts ranging from about 0.01 to 0.1 weight percent of the mixture. Alternatively, the surfactant may be added directly to the electrolyte. Satisfactory results are attained when the surfactant is added to the electrolyte in amounts of from about 0.1 to 1.0 weight percent of the electrolyte. The surfactant used should be soluble in or at least miscible with the aqueous electrolyte and preferably compatible with all the cell components. Suitable surfactants or wetting agents for this purpose are synthetic nonionic organic surfactants such as those based on alkylaryl polyethers, e.g., Triton 100 — Rohm & Haas Inc.

The finely-divided electrically conductive material is used in the cathodes of the present invention in order to assure good electronic conductivity throughout the entire cathode body. Polycarbonfluoride compounds having a high fluorine content are notoriously poor conductors as is well known in the art. Therefore it is essential that the cathode contains the electrically conductive material. Suitable finely-divided electrically conductive materials are carbon black and graphite, for example.

It has been found in accordance with the present invention that a high utilization of the cathode material can be attained if fine particle size $(CF_x)_n$ powders are used. The molding pressure is also an important factor and generally should be maintained within the range of from about 2,000 to 8,000 lbs per cm$^2$ (about 1,000–4,000 kg/cm$^2$. Nearly 100% utilization has been achieved with cathodes made from 20 microns $(CF_{1.0})_n$ powders using a molding pressure of about 5,000 lbs per cm$^2$ (2,500 kg/c$^2$).

The specific surface area of polycarbonfluoride compounds will vary widely depending on the particular form of carbon material that is used in the preparation of the compound. Polycarbonfluoride compounds made from charcoal, for example, possess a surface area of about 176 m$^2$/gm while those made from graphitic fibers have a surface area of about 340 m$^2$/gm. Generally, polycarbonfluoride compounds having a surface area of at least about 200 m$^2$/gm are preferred for use in the cathodes of the present invention. However, it should be understood that the surface area of the particular $(CF_x)_n$ material used is not narrowly critical.

The anodes used in cells of the present invention may be most any form of zinc metal or alloy. The anode may be a zinc plate or sheet, a pressed powder anode or an open zinc mesh anode. Preferably, however, the anode is a gelled zinc anode which is less susceptible to passivation. Such anodes comprise finely-divided zinc particles suspended in a gelling agent such as carboxymethylcellulose, containing the aqueous alkaline electrolyte.

The electrolyte used in cells of the present invention may be most any aqueous alkaline solution such as aqueous solutions of potassium, sodium and lithium hydroxide as well as mixture thereof. Aqueous potassium hydroxide solutions of fairly high concentrations, i.e. in the range of 5 to 14 molar (5–14M) KOH solutions, are preferred. The most preferred electrolyte is an aqueous 13–14M KOH solution.

The present invention will be further illustrated by the following example:

Experimental test cells were made using a zinc screen anode, a polycarbonfluoride cathode and aqueous alkaline electrolytes of different compositions. The cells were assembled using AA-size nickel-plated steel cans as cell containers (i.e. cans coventionally used in AA-size alkaline MnO$_2$ cells) having an inner diameter of 1.27 centimeters. Cathodes were prepared for the cells using a mixture of 80% by weight $(CF_{1.0})_n$ powders, 10% by weight carbon black, 5% by weight carboxymethylhydroxyethylcellulose and 5% by weight "Solka-Floc" — a cellulosic material manufactured by Brown Company. This mixture was uniformly spread onto a nickel screen and molded under a pressure of 5,000 lbs per cm (about 2,500 kg/cm$^2$) to form a cathode sheet. The weight of the nickel screen was 0.0386 grams per cm$^2$. The mix content of the cathode sheet was 0.27 grams per in$^2$ (0.042 grams per cm$^2$). The percent of $(CF_{1.0})$ in the cathode sheet was 41.6%. Cathode discs approximately 1.27 centimeters in diameter were punched out from the cathode sheet. Each cathode disc contained 0.0425 grams $(CF_{1.0})_n$ and had a theoretical capacity of 36.8 milliampere hours (mAh). Two discs were placed inside each of the nickel-plated steel cans and packed together at the bottom under a pressure of approximately 2,000 lbs per cm$^2$ (about 1000 kg/cm$^2$). The anode for the cells was a zinc screen measuring ⅝ inch long and ⅜ inch wide (1.53 cm long and 0.92 cm wide). The weight of the zinc screen was 1.5 grams. Various aqueous electrolytes were prepared containing conventional salts such as ammonium chloride, zinc chloride, magnesium perchlorate and magnesium bromide as well as aqueous alkaline solutions including the range of 0.2 to 13 molar (0.2–13M)KOH, 19M NaOH and 6M LiOH solutions. Different electrolyte solutions were poured into each cell container to approximately three quarters or more of its height. The containers were closed using a rubber stopper which fit tightly inside the open end. The zinc screen anode covered by a porous paper separator, was suspended from the stopper in contact with the electrolyte by a copper wire encased in plastic. The copper wire was spot welded to the zinc screen and extended outside the cell to form a terminal lead. The cells were tested for open circuit voltage (OCV) and then discharged at low and moderate current drains of 0.1 and 1.0 milliamperes, respectively (about 0.08 and about 0.8 milliamperes/cm$^2$). The closed circuit voltage (CCV) of the cells was recorded throughout the discharge period and the open circuit voltage was recorded after 12 milliampere-hours (mAh) discharge. Table I below summarizes the results of the tests.

TABLE I

| Cell | Electrolytes | Initial OCV | OCV* | CCV** (1.0 mA) | CCV** (0.1 mA) |
|---|---|---|---|---|---|
| 1. | 13M KOH | 1.392 | 1.317 | 1.030 | 1.148 |
| 2. | 9M KOH | 1.370 | 1.253 | 0.962 | 1.049 |
| 3. | 5M KOH | 1.340 | 1.290 | 0.900 | 1.186 |
| 4. | 1M KOH | 1.298 | 1.225 | 0.717 | 0.809 |
| 5. | 0.2M KOH | 1.298 | 0.124 | | |
| 6. | 19M NaOH | 1.083 | 1.139 | 1.00 | 1.024 |
| 7. | 6M LiOH | 1.338 | 1.041 | 0.718 | 0.812 |
| 8. | 2M MgBr$_2$ + Mg(OH)$_2$ | 0.664 | 0.511 | 0 | 0.076 |
| 9. | 2M Mg(ClO$_4$)$_2$ + Mg(OH)$_2$ | 0.995 | 0.411 | 0 | 0.098 |
| 10. | 5M NH$_4$Cl+NH$_3$, ph 8.3 | 0.737 | 0.474 | 0.110 | 0.281 |
| 11. | 5M NH$_4$Cl+2M ZnCl$_2$, ph 4.5 | 0.856 | 0.415 | 0 | 0.002 |

*At the 12 mAh discharge point, (the initial OCV may not be the true voltage of the system, because O$_2$ may be adsorbed on the material).
**At the 9 mAh discharge point It can be seen from Table I that cells employing the polycarbonfluoride cathode can be successfully discharged in concentrated aqueous alkaline electrolyte. Cells using the $(CF_{1.0})_n$ cathode and a 5–13M KOH electrolyte exhibit open circuit voltages of between 1.2 and 1.3 volts and an average closed circuit voltage of about 1.0 volt. It will be further seen however from Table I that cells employing the polycarbonfluoride cathode cannot be successfully discharged in the aqueous salt electrolytes. The closed circuit voltage of the cells with these electrolytes is essentially 0.0 volt.

Curves a–e in FIG. 1 show the discharge characteristics of these small cells using the $(CF_{1.0})_n$ cathode and 0.2M–13M KOH electrolyte when placed on a 1 milliampere drain (0.8 mA/cm$^2$). It will be noted that the discharge curves a–c for each of the cells using the 5–13M KOH electrolyte are relatively flat over most of the discharge period.

Figure 2:
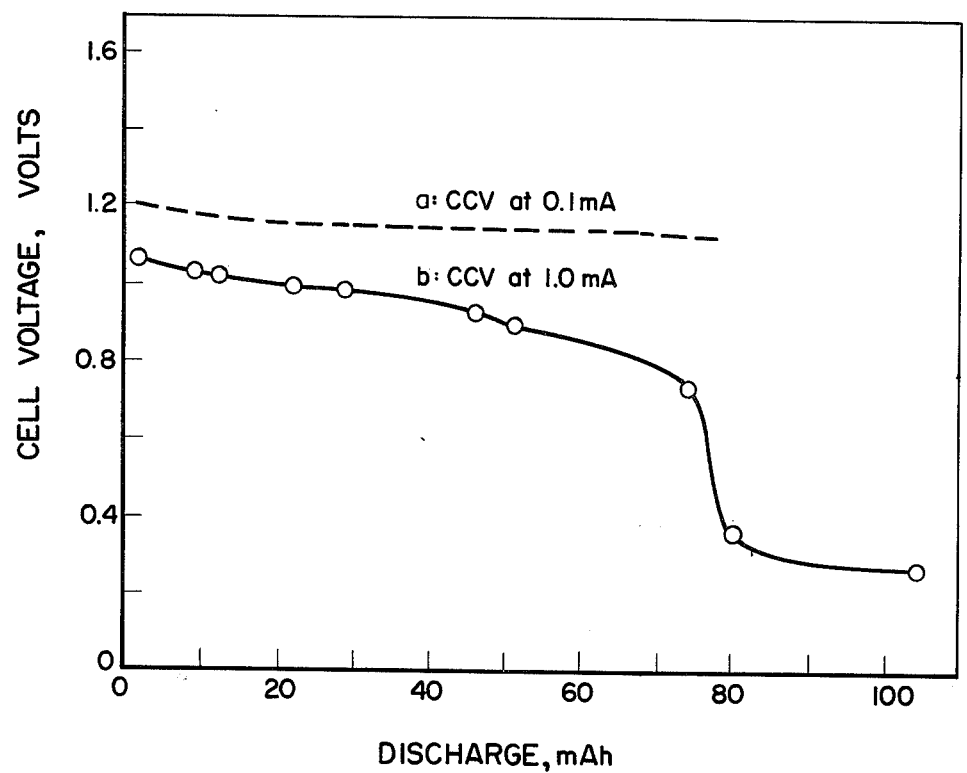
FIG. 2 is a group of curves showing the discharge characteristics of the same type of small alkaline zinc-$(CF_x)_n$ cell at two different current drains.

Curves a and b in FIG. 2 show the discharge characteristics of the small cell using the $(CF_{1.0})_n$ cathode and 13M KOH electrolyte when placed on 0.1 and 1.0 milliampere (mA) current drain. It will be noted from curve b (1.0 mA drain) that the voltage of the cell suddenly drops at about 75 mAh at the end of the discharge period. Since the theoretical capacity of the two disc $(CF_{1.0})_n$ cathode is 73.6 mAh, the sudden drop in cell voltage indicates that nearly 100% utilization of the polycarbonfluoride cathode was attained.

The cathode reaction in a Zn-$(CF_x)_n$ cell as hereinafter mentioned produces fluoride ions according to the following reaction: $(CF_x)_n + nxe^- \rightarrow nC + xF^-$. It has been found that the addition of certain compounds such as Al$_2$O$_3$ or TiO$_2$ which will form strong complexes with the fluoride ions in KOH electrolyte, e.g., $[AlF_6]^=$, $[TiF_6]^=$, etc., is beneficial for producing higher cell voltages. Cells were prepared using a zinc screen anode and a $(CF_{1.0})_n$ cathode made in the same manner as described in the foregoing experiment (i.e. with the AA size cell containers). The net $(CF_{1.0})_n$ content in the cathode was 0.104 grams. The electrolyte was a 13M KOH solution. Each cell was prepared with the KOH electrolyte containing a suspension of about 20% by weight or more of $Al_2O_3$, $SiO_2$, $TiO_2$ or ZnO as an additive based on the weight of electrolyte. The resulting OCV and CCV at 50% depth of discharge were recorded for each cell. The 50% depth of discharge corresponds to 45 mAh capacity delivered. The results of this experiment are shown in Table II. The closed circuit voltages were higher in the presence of all additives and the open circuit voltages were also higher in the presence of $Al_2O_3$, $TiO_2$ and $SiO_2$.

TABLE II

| Cell No. | Additive | CCV at 1.0 mA | CCV at 0.1 mA | OCV |
|---|---|---|---|---|
| 1. | none | 0.946 | 1.049 | 1.203 |
| 2. | ZnO | 0.956 | 1.062 | 1.197 |
| 3. | $Al_2O_3$ | 0.978 | 1.075 | 1.214 |
| 4. | $TiO_2$ | 0.962 | 1.077 | 1.233 |
| 5. | $SiO_2$ | 0.948 | 1.057 | 1.212 |

Polycarbonfluoride cathodes for use in cells of the present invention can be made in the manner as hereinabove described by molding a mixture of the $(CF_x)_n$ powders and finely-divided conductive material together with an electrolyte-absorbing material and binder such as carboxymethylcellulose, and optionally a surfactant. As mentioned, the electrically conductive material assures that good physical and electrical contact is achieved between the $(CF_x)_n$ powders and the aqueous alkaline electrolyte. The electrolyte-absorbing material also serves as a binder for the $(CF_x)_n$ powders and the finely-divided conductive material.

In the preferred practice of the present invention, however, cathodes are made by molding a mixture of the $(CF_x)_n$ powders, particulate electrically conductive material, an electrolyte-wettable polymeric binder and a collodial electrrically conductive material. The polymeric binder and the colloidal electrically conductive material in the range of 0.5 to 20 weight percent and 2 to 10 weight percent respectively, based on the weight of the total cathode mixture, are mixed together and added to the cathode mixture as a suspension containing an organic solvent which readily wets the $(CF_x)_n$ powders. Solvents such as those based on xylene, isobutanol, isopropanol, etc., are excellent for this purpose. The polymeric binder may be an epoxy, polysulfone or acrylic resin, for example, and is preferably used in amounts of between 0.5 and 5 weight percent of the cathode mixture. Commercial suspensions containing the polymeric binder, collodial graphite and or organic solvent are available such as "Dag" dispersion No. 2404, produced by the Acheson Colloids Division of Acheson Industries, Inc., Port Huron, Michigan.

In one example of the above, cathodes were prepared using the following mix composition: 2 grams $(CF_{1.0})_n$ powder, 0.1 gram acetylene black and 1 cc of "Dag" dispersion No. 2404 (contains 10% collodial graphite suspended in mineral spirits). The composition was mixed thoroughly and heated at 90°C. in air for 2 hours to drive off the solvent. The dried powder mix was then molded at a pressure of about 4,000 lbs/cm$^2$ (about 2,000 kg/cm$^2$) to form the cathode body.

Because of the high practical energy densities that are attainable, the alkaline zinc-$(CF_x)_n$ cell system is ideally suited for use in miniature size electric current-producing dry cells.

Figure 3:
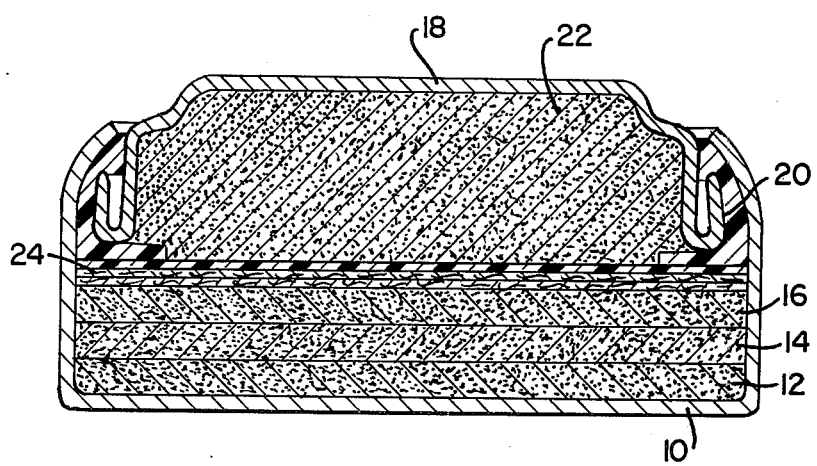
FIG. 3 is a cross-sectional view of a typical button cell made in accordance with the present invention.

FIG. 3 shows a typical miniature button cell made in accordance with the present invention. As shown, the cell comprises a metal container 10 in the bottom of which is disposed three cathode discs 12, 14 and 16 containing $(CF_x)_n$ as the additive cathode material and an inverted metal anode cup 18, both the container 10 and anode cup 18 being made of nickel plated steel, for example. The anode cup 18 is sealed within the open end of the container 10 by means of a plastic insulating gasket 20. The anode 22 is disposed inside the anode cup 18 and may be a conventional gelled zinc powder anode composed of zinc particles suspended in a gelling agent, such as carboxymethylcellulose, containing the aqueous alkaline electrolyte. Three layers of a suitable ion permeable separator material 24 isolate the anode 22 from the cathode discs. The separator material is thoroughly soaked with the aqueous alkaline electrolyte.

In one series of experiments, button cells of the construction shown in FIG. 3 were made using three compressed cathode disc containing 80% by weight $(CF_{1.0})_n$ powders, each disc having a diameter of 11.3 mm and a thickness of 0.395 mm. The weight of each disc was 0.127 gram and the total theoretical capacity of the cathode was about 86.3 mAh based on the $(CF_{1.0})$ content. The anode was a zinc gel containing 62.55% by weight zinc particles 1.03% by weight carboxymethylcellulose, and 5.2% by weight mercury, the remainder being aqueous 14.2M KOH electrolyte. The separator consisted of one layer of an ion permeable cellophane film placed adjacent to the zinc gel and two layers of rayon thoroughly soaked with 14.2M KOH. The cells were divided into two groups, the cells in one group being discharged immediately at room temperature on a 1mA current drain. The second group of cells was stored at 71°C. for 1 week and then discharged at the same current drain at room temperature. The voltage of the cells stored at 71°C. was somewhat lower in the late stages of discharge than fresh, unheated cells, but there was no evidence of cell deterioration.

Table III below compares selected properties of the $(CF_{1.0})_n$ material with those of conventional cathode materials used in miniature cells. It will be seen from the table that the energy density of the $(CF_{1.0})_n$ material far exceeds that of the conventional $Ag_2O$ and nearly equals that of the HgO used in conventional mercury cells. Since the cost of the $(CF_{1.0})_n$ material is substantially less than that of HgO, it will be seen that the aqueous alkaline zinc-$(CF_{1.0})_n$ cell system is ideally suited for cells in which HgO cathodes are normally used.

TABLE III

| | Formula Weight | Density ($g/cm^3$) | Capacity (mAh/g) | Capacity ($mAh/cm^3$) | Cell Voltage With Zn Anode | Energy Density ($WH/cm^3$) |
|---|---|---|---|---|---|---|
| 1. $Ag_2O$ | 231.7 | 7.143 | 231.2 | 1651 | 1.55 | 2.56 |
| 2. $HgO$ | 216.6 | 11.1 | 247.5 | 2747 | 1.30 | 3.57 |
| 3. $CF_{1.0}$ | 31.0 | 2.7 | 864.2 | 2333 | 1.30 | 3.03 |

What is claimed is:

1. A primary electric current-producing dry cell comprising a zinc anode, a cathode comprising a polycarbonfluoride compound of the formula $(CF_x)_n$, electrically conductive material and an electrolyte absorbing material, and an aqueous alkaline electrolyte.

2. The dry cell as defined by claim 1 wherein the polycarbonfluoride compound has the general formula $(CF_x)_n$ wherein $x$ is a value of between about 0.3 and 1.1 and wherein $n$ refers to an indefinite number of the recurring $(CF_x)_n$ groups.

3. The dry cell as defined by claim 2 wherein the electrolyte is an aqueous alkaline solution selected from the group consisting of potassium, sodium and lithium hydroxide and mixture thereof.

4. The dry cell as defined by claim 2 wherein the polycarbonfluoride compound has an $x$ value of about 1.0.

5. The dry cell as defined by claim 4 wherein the electrolyte is an aqueous potassium hydroxide electrolyte solution in the concentration range of 5 to 13 molar.

6. The dry cell as defined by claim 4 wherein the cathode comprises a mixture of from about 60 to 95 weight percent of $(CF_{1.0})_n$ powder, from about 5 to 40 weight percent particulate electrically conductive material based on the weight of the mixture of active and conductive material, from about 0.5 to 20 weight percent of a polymeric binder including said electrolyte absorbing material and from about 2 to 10 weight percent of a collodial electrically conductive material based on the total weight of the cathode mixture.

7. The dry cell as defined by claim 5 wherein the cathode is composed of a mixture of from about 60 to 95 weight percent $(CF_{1.0})_n$ powder, from about 5 to 40 weight percent of an electrically conductive material biased on the weight of the active and conductive material, and from about 1 to 10 weight percent of a binder including said electrolyte-absorbing material, the latter percentages being based on the total weight of the cathode mixture.

8. The dry cell as defined by claim 5 wherein a compound selected from the group consisting of $Al_2O_3$, $SiO_2$, $TiO_2$, ZnO and mixture thereof, is added to said electrolyte in an amount sufficient to increase the cell discharge voltage.

9. The dry cell as defined by claim 7 wherein a surfactant is added to said cathode mixture in amounts sufficient to insure the wetting of the $(CF_{1.0})_n$ powder by said aqueous alkaline electrolyte.

10. The dry cell as defined by claim 7 wherein said electrolyte-absorbing material is selected from the group consisting of carboxymethylcellulose and carboxymethylhydroxyethyl-cellulose.

11. The dry cell as defined by claim 7 wherein the electrically conductive material is selected from the group consisting of carbon black and graphite.

12. The dry cell as defined by claim 7 wherein the $(CF_{1.0})_n$ powder possess a surface area of at least about 200 square meters per gram.

13. The dry cell as defined by claim 7 wherein the electrolyte is an aqueous potassium hydroxide electrolyte solution in the concentration range of 13 to 14 molar.

14. The dry cell as defined by claim 9 wherein the surfactant is added to the cathode mixture in amounts ranging from about 0.01 to 0.1 weight percent of said mixture.

15. A primary electric current-producing dry cell comprising a zinc anode, a cathode comprising a polycarbonfluoride compound of the formula $(CF_x)_n$ and electrically conductive material, an aqueous alkaline electrolyte and a wetting agent.

16. A dry cell as defined by claim 15 wherein the polycarbonfluoride compound has the general formula $(CF_x)_n$ wherein $x$ is a value of between about 0.3 and 1.1 and wherein $n$ refers to an indefinite number of the recurring $(CF_x)_n$ groups.

17. The dry cell as defined by claim 16 wherein the electrolyte is an aqueous alkaline solution selected from the group consisting of potassium, sodium and lithium hydroxide and mixtures thereof.

18. The dry cell as defined by claim 17 wherein the polycarbonfluoride compound has an $x$ value of about 1.0.

19. The dry cell as defined by claim 18 wherein the electrolyte is an aqueous potassium hydroxide electrolyte solution in the concentration range of 5 to 13 molar.

20. The dry cell as defined by claim 18 wherein the cathode comprises a mixture of from about 60 to 95 weight percent of $(CF_{1.0})_n$ powder, from about 5 to 40 weight percent particulate electrically conductive material based on the weight of the mixture of active and conductive material, from about 0.5 to 20 weight percent of a electrolyte wettable polymeric binder and from about 2 to 10 weight percent of a colloidal electrically conductive material based on the total weight of the cathode mixture.

21. The dry cell as defined by claim 19 wherein the cathode is comprises a mixture of from about 60 to 95 weight percent $(CF_{1.0})_n$ powder, from about 5 to 40 weight percent of an electrically conductive material based on the weight of the active and conductive material, from about 1 to 10 weight percent of a binder, the latter percentages being based on the total weight of the cathode mixture.

22. The dry cell as defined by claim 19 wherein a compound selected from the group consisting of $Al_2O_3$, $SiO_2$, $TiO_2$, ZnO and mixtures thereof, is added to said electrolyte in an amount sufficient to increase the cell discharge voltage.

23. The dry cell as defined by claim 21 wherein said wetting agent is added to said cathode mixture in amounts sufficient to insure the wetting of the $(CF_{1.0})_n$ powder by said aqueous alkaline electrolyte.

24. The dry cell as defined by claim 21 wherein said wetting agent is added to said aqueous alkaline electrolyte in amounts sufficient to insure the wetting of $(CF_{1.0})_n$ powder by said aqueous alkaline electrolyte.

25. The dry cell as defined by claim 21 wherein the electrically conductive material is selected from the group consisting of carbon black and graphite.

26. The dry cell as defined by claim 21 wherein the $(CF_{1.0})_n$ powder possesses a surface area of at least about 200 meters per gram.

27. The dry cell as defined by claim 21 wherein the electrolyte is an aqueous potassium hydroxide electrolyte solution in the concentration range of 13 to 14 molar.

28. The dry cell as defined by claim 23 wherein said wetting agent is added to the cathode mixture in amounts ranging from about 0.01 to 0.1 weight percent of said mixture.

29. The dry cell as defined by claim 23 wherein said wetting agent is an electrolyte wettable polymeric material.

30. The dry cell as defined by claim 28 wherein said wetting agent is a synthetic nonionic organic surfactant based on alkylaryl polyethers.

31. The dry cell as defined by claim 24 whererin said wetting agent is a synthetic nonionic organic surfactant based on alkylaryl polyethers.

* * * * *